(12) United States Patent
Batten et al.

(10) Patent No.: US 7,641,805 B2
(45) Date of Patent: *Jan. 5, 2010

(54) PASSIVE GREASE TRAP WITH PRE-STAGE FOR SOLIDS SEPARATION

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/929,104

(22) Filed: Oct. 30, 2007

(65) Prior Publication Data

US 2009/0107910 A1   Apr. 30, 2009

(51) Int. Cl.
*B01D 21/02* (2006.01)
(52) U.S. Cl. .................. 210/801; 210/232; 210/519; 210/521; 210/532.1; 210/538
(58) Field of Classification Search ............. 210/800, 210/801, 804, 232, 252, 258, 519, 521, 532.1, 210/532.2, 534, 535, 538, 540
See application file for complete search history.

(56) References Cited

U.S. PATENT DOCUMENTS

| | | | | |
|---|---|---|---|---|
| 978,889 | A | 12/1910 | Imhoff | 210/532.2 |
| 1,200,951 | A | 10/1916 | Kelly, Jr. | 210/540 |
| 2,213,458 | A | 9/1940 | Buckley | 210/6 |
| 2,226,968 | A | 12/1940 | Clerici | 210/6 |
| 2,338,971 | A * | 1/1944 | Ross | 210/532.1 |
| 3,224,593 | A | 12/1965 | Nebolsine | 210/519 |
| 3,662,918 | A * | 5/1972 | Crawford et al. | 210/532.2 |
| 4,038,186 | A * | 7/1977 | Potter et al. | 210/519 |
| 4,372,854 | A | 2/1983 | Szereday | 210/242.3 |
| 4,385,986 | A | 5/1983 | Jaisinghani et al. | 210/123 |
| 4,406,789 | A | 9/1983 | Brignon | 210/519 |
| 4,451,366 | A | 5/1984 | Smisson | 210/209 |
| 4,554,074 | A | 11/1985 | Broughton | 210/519 |
| 4,559,141 | A | 12/1985 | Gyulavari | 201/2.5 |
| 4,832,846 | A * | 5/1989 | Gavin | 210/532.2 |
| 4,938,878 | A | 7/1990 | Hall | 210/744 |
| 4,985,148 | A | 1/1991 | Monteith | 210/519 |
| 5,021,153 | A | 6/1991 | Haws | 210/221.2 |
| 5,178,754 | A | 1/1993 | Batten et al. | 210/138 |
| 5,204,000 | A * | 4/1993 | Steadman et al. | 210/519 |
| 5,225,085 | A | 7/1993 | Napier et al. | 210/705 |
| 5,405,538 | A | 4/1995 | Batten | 210/744 |
| 5,453,187 | A | 9/1995 | Plumb | 210/202 |

(Continued)

OTHER PUBLICATIONS

"Guide to Grease Interceptors", The Plumbing and Drainage Institute, 1998.

*Primary Examiner*—Christopher Upton
(74) *Attorney, Agent, or Firm*—MacCord Mason PLLC (57) ABSTRACT

A solids collector for collecting solids in waste water that are heavier than water includes a roto-molded plastic container having a cylindrical sidewall and a downwardly sloping bottom. An inlet and outlet are connected to the sidewall substantially above the sloping bottom so that solids that are heavier than water in the waste water coming into the container through the inlet have residence time in the container long enough to gravitationally separate towards the bottom. Waste water depleted of solids that are heavier than water discharge from the container through the outlet.

13 Claims, 7 Drawing Sheets

U.S. PATENT DOCUMENTS

| | | | |
|---|---|---|---|
| 5,453,197 A * | 9/1995 | Strefling | 210/519 |
| 5,505,860 A | 4/1996 | Sager | 210/519 |
| 5,560,826 A | 10/1996 | Szereday et al. | 210/522 |
| 5,565,101 A | 10/1996 | Kuntz | 210/304 |
| 5,714,069 A | 2/1998 | Sager | 210/519 |
| 5,718,824 A | 2/1998 | Kannan et al. | 210/207 |
| 5,725,760 A | 3/1998 | Monteith | 210/170 |
| 5,730,872 A | 3/1998 | Rhodes | 210/519 |
| 5,746,911 A | 5/1998 | Pank | 210/170 |
| 5,849,181 A | 12/1998 | Monteith | 210/163 |
| 5,861,098 A | 1/1999 | Morrison | 210/774 |
| 5,993,646 A | 11/1999 | Powers | 210/86 |
| 6,068,765 A | 5/2000 | Monteith | 210/170 |
| 6,120,684 A * | 9/2000 | Kistner et al. | 210/521 |
| 6,238,572 B1 | 5/2001 | Batten | 210/739 |
| 6,328,890 B1 * | 12/2001 | Thibault | 210/532.2 |
| 6,413,435 B1 | 7/2002 | Kyles et al. | 210/800 |
| 6,475,381 B1 | 11/2002 | Gustafsson | 210/151 |
| 6,800,195 B1 * | 10/2004 | Batten et al. | 210/540 |
| 7,367,459 B2 * | 5/2008 | Batten et al. | 210/521 |
| 2001/0025811 A1 | 10/2001 | Batten et al. | 210/143 |
| 2002/0003104 A1 * | 1/2002 | Evanovich et al. | 210/153 |
| 2007/0251879 A1 | 11/2007 | Batten | 210/532.1 |

* cited by examiner

PASSIVE GREASE TRAP WITH PRE-STAGE FOR SOLIDS SEPARATION

BACKGROUND OF THE INVENTION

The present application includes subject matter in common with U.S. patent application Ser. No. 11/413,034, the entire disclosure of which is incorporated herein by reference.

Historically, grease traps have been used in restaurants and other commercial facilities to limit the amount of grease and solid waste that it carried into sewer systems via waste water. Typical grease traps are either passive grease traps or automatic grease traps. Passive grease traps are usually only emptied of the waste periodically and therefore waste tends to build up inside the tank. Passive grease traps typically include a tank with an inlet that brings in waste water and an outlet that carries water out of the system. Lightweight grease rises to the top of the tank and heavier solids settle in the bottom of the tank. A problem with many grease traps is that water may flush through the system with such velocity that it disrupts the grease that has already separated, causing the waste to be expelled with grey water. This is especially true as the tank fills up with grease, so that the grease/water interface is closer to the grease trap bottom.

Our prior U.S. patent application Ser. No. 11/413,034 discloses a passive grease trap which can be made economically. It has facilities for catching and holding solids and grease so that they can be pumped out at separate intervals and has proven to be commercially successful.

However, in some circumstances there is a need or desire for additional solids containment. The present application is directed towards addressing that issue.

SUMMARY OF THE INVENTION

The present invention fulfills one or more of these issues in the art by providing a grease trap for separating waste from waste water including a container having a bottom and an inlet to receive waste water substantially above the bottom and an outlet substantially above the bottom. Solids in the waste water that are heavier than water have residence time in the container long enough to gravitationally separate towards the bottom as waste water depleted of solids that are heavier than water discharge from the container through the outlet. Also included is a tank having a downwardly sloped bottom. An inlet invert in the tank is connected to the outlet of the container for receiving incoming waste water into the tank. An upwardly sloped divider divides the tank into an upper chamber and a lower chamber. A hole near or at an upper part of the divider allows waste into the upper chamber, and an outlet invert allows water to exit from the tank. A lid covers the tank, and a pipe extends to the lower chamber for sucking solid waste out of the lower chamber.

Preferably, the trap is roto-molded plastic. In one embodiment the upwardly sloped divider is formed as a bottom of an inner tank, and the inner tank has an inlet tunnel and a fin-like baffle on the divider near the inlet tunnel to force incoming flow to the periphery of the outer tank. When the inner tank has an outlet tunnel surrounding the outlet invert, a cut out can be located near the top of the outlet tunnel to allow FOG in the outlet tunnel to transfer into the inner tank and be sequestered.

The invention also provides a solids collector for collecting solids in waste water that are heavier than water including a roto-molded plastic container having a cylindrical sidewall and a downwardly sloping bottom. An inlet and an outlet are connected to the sidewall substantially above the sloping bottom so that solids that are heavier than water in the waste water coming in through the inlet have residence time in the container long enough to gravitationally separate towards the bottom as waste water depleted of solids that are heavier than water discharge from the container through the outlet.

The invention can also be considered as a solids collector for collecting solids in waste water that are heavier than water including a container having a cylindrical sidewall and a downwardly sloping bottom, an inlet and outlet connected to the sidewall substantially above the sloping bottom so that solids in the waste water that are heavier than water have residence time in the container long enough to gravitationally separate towards the bottom as waste water depleted of solids that are heavier than water discharge from the container through the outlet. A baffle connected to the inlet and located within the container is configured to slow waste water coming into the container from a higher speed to a lower speed and thereby reduce entrainment of solids that are heavier than water in the slowing waste water to enable the solids to precipitate to the bottom of the solids collector.

The baffle may include a housing providing an annular path for the incoming waste water and openings lateral of the inlet to divert and retard incoming waste water. The annular path may include a floor that slopes downwardly from within the annulus to a periphery of the annulus. Preferably, the openings are transverse a path from the inlet to the outlet within the tank.

The invention can also be considered as method of installing a grease trap for separating waste from waste water including installing a container having a bottom and an inlet to receive waste water substantially above the bottom and an outlet substantially above the bottom. The installation permits solids in the waste water that are heavier than water to have residence time in the container long enough to gravitationally separate towards the bottom as waste water depleted of solids that are heavier than water discharge from the container through the outlet. The method includes installing a tank downstream of the outlet of the container. The tank being installed has a downwardly sloped bottom and the method includes connecting the outlet of the container to an inlet invert in the tank. Also included in the method is connecting an outlet invert from the tank to a sewage discharge line; and positioning a lid covering the tank.

The invention can also be considered as a method of making a solids collector including molding container having a cylindrical sidewall and a downwardly sloping bottom, installing an inlet and outlet to opposing segments of the cylindrical sidewall, installing a baffle on the inlet configured so as to slow waste water coming into the container from a higher speed to a lower speed and thereby reduce entrainment of solids that are heavier than water in the slowing waste water to enable the solids to precipitate to the bottom of the solids collector.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
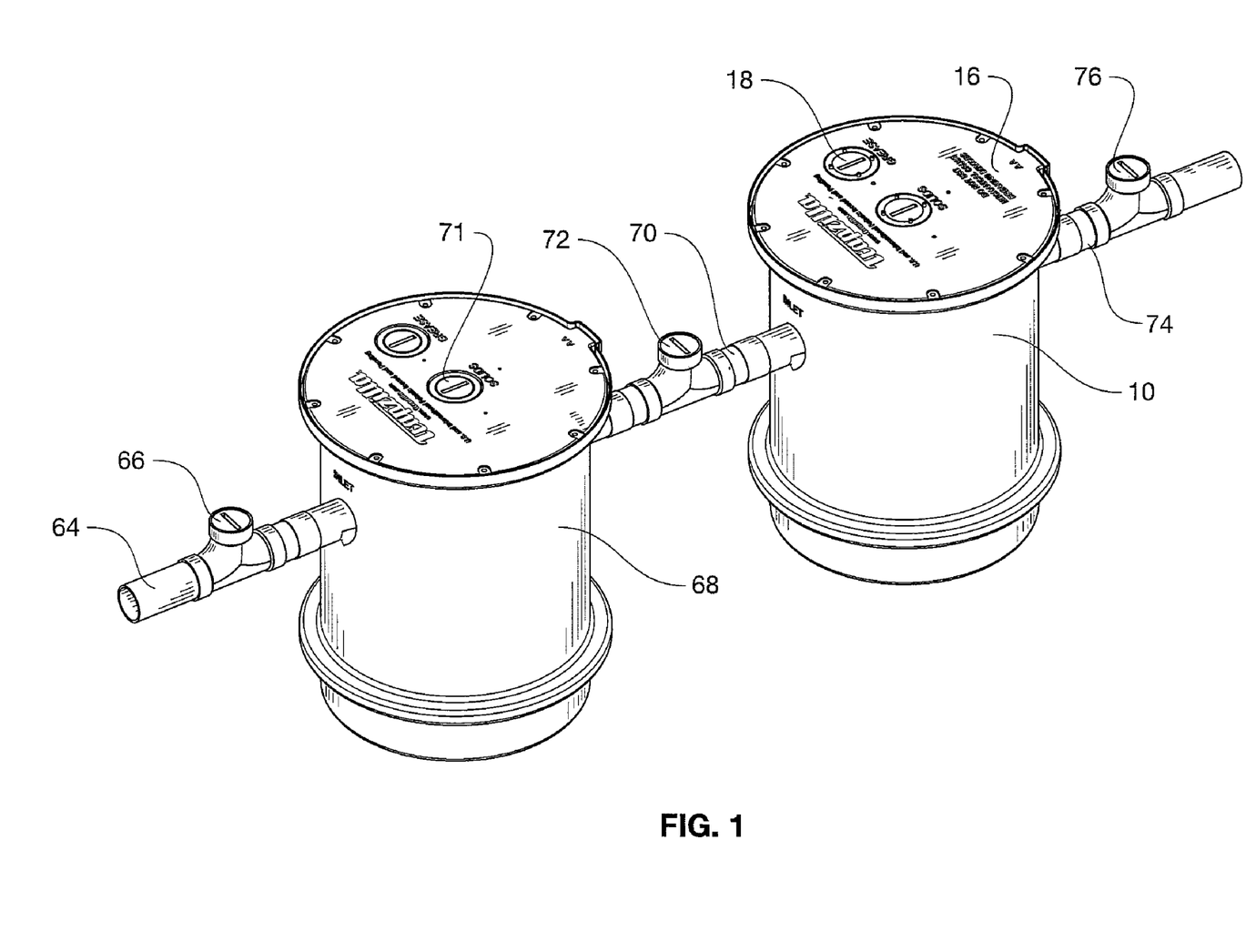
FIG. 1 is a perspective view of an installation of a solids collector together with a grease trap.

FIG. 1 shows an installation having both an upstream solids collector 68 and a downstream grease trap or grease interceptor 10. Effluent from a kitchen or other source of solids can enter the system through an inlet pipe 64 having a clean out port 66, for discharge into the solids interceptor 68. The effluent typically carries a fats, oils and grease ("F.O.G.") which are to be removed before the effluent is discharged to a sewer line where the F.O.G. can cause clogs. As discussed below, the solids interceptor 68 is configured and arranged to intercept and retain solids within its tank with cylindrical side wall and sloping bottom and allow grease-laden water to pass downstream through a drain line 70 having its own clean out port 72. The waste water exiting through port 70 passes to the grease interceptor 10, discussed in more detail below. The grease interceptor 10 has a primary function of collecting grease, but also will collect some solids that continue to be entrained in the flow. The gray water which has been depleted of solids and grease is discharged from the grease interceptor 10 through drain 74 which also has a clean out port 76. The drain 74 can be connected to a downstream waste treatment facility such as through a sewer or the like.

Figure 2:
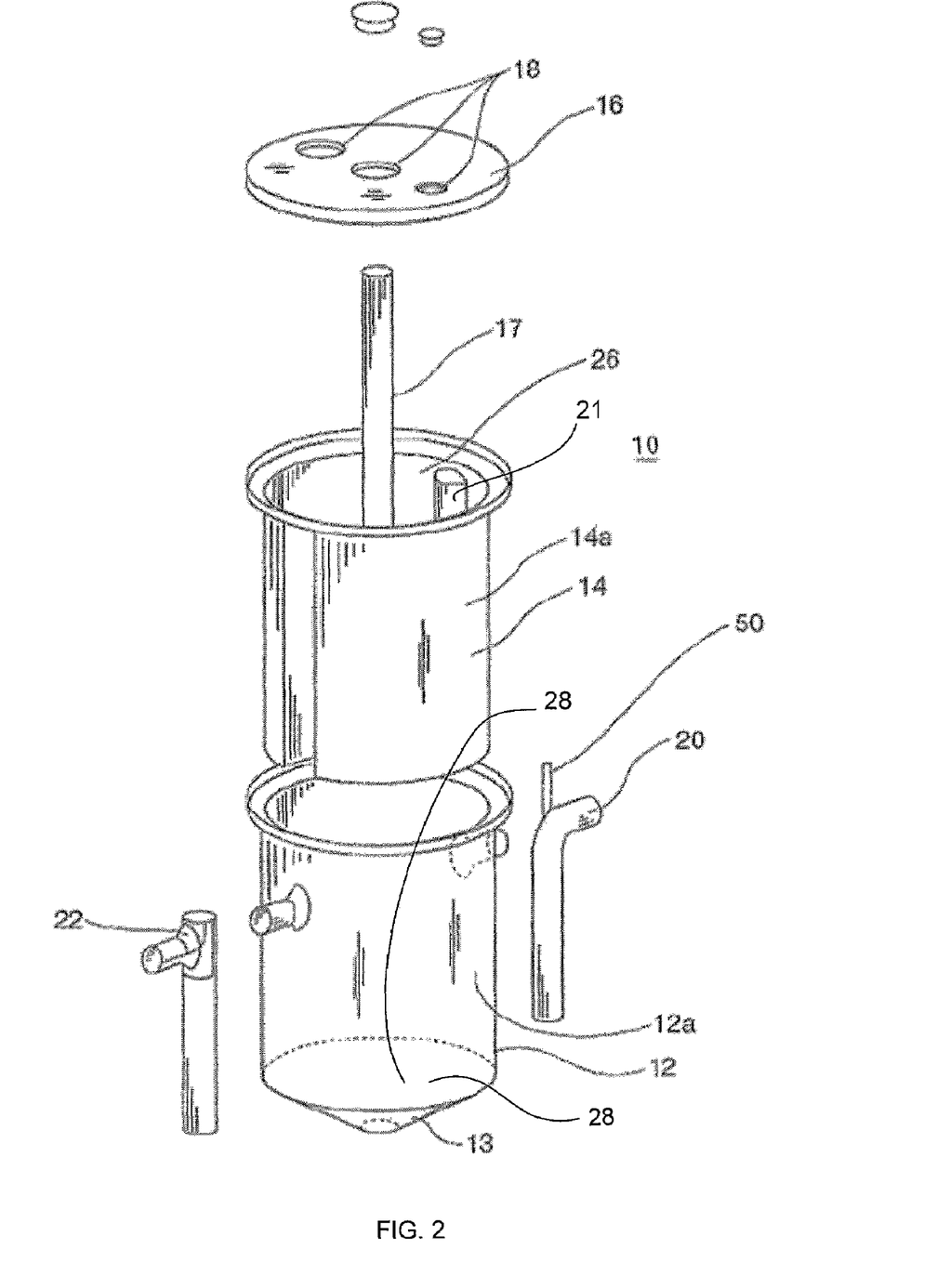
FIG. 2 is an exploded view of the grease trap constructed according to an embodiment of the invention.

As seen in FIG. 2, in exploded view, the grease trap 10 includes an outer tank 12 with a downwardly sloped bottom 13. In the embodiment of FIG. 2, the downward slope is toward a central area. An inner tank 14 is inserted into the outer tank 12 such that there is very little space, if any, between the walls 14*a* of the inner tank 14 and the walls 12*a* of the outer tank 12. The tanks are preferably circular, but other shapes such as pentagonal, trapezoidal, triangular, or even free form could be used.

The inner tank 14 has a bottom that slopes upwardly to a central area (not shown), so that the bottom of the inner tank 14 and the downwardly sloped bottom 13 of the outer tank 12 diverge. The upwardly sloped bottom divides the outer tank 12 into an upper chamber 26 where lightweight grease collects, and a lower chamber 28 where heavy solids may settle.

In use, the diverging upwardly sloped bottom and the downwardly sloped bottom 13 aid in the separation of grease and solid waste from water. As water, oil, and grease flow into this area through the inlet invert 20 (which opens below the bottom of the inner tank), the velocity slows as it approaches a position of greatest separation between the upwardly sloped bottom and the downwardly sloped bottom 13. This is where the cross-sectional area that the water current encounters is the greatest. This concept of increasing residence time and enabling greater separation by slowing the flow in an area of greater cross-section is disclosed in U.S. Pat. No. 6,238,572 to Batten, the entire disclosure of which is hereby incorporated by reference. The slower the velocity of the fluid, the greater the probability that the lightweight grease can separate from the water and rise to the apex of the upwardly sloped bottom 15 and eventually through a central hole in the upwardly sloped bottom. Remaining heavy solids can also settle out. After passing the position of greatest divergence, the velocity can increase as the fluid makes its way from the center to the outlet invert 22.

Preferably, the inner tank 14 and the outer tank 12 are roto-molded plastic. In some cases, the inlet invert, outlet invert, and outer tank are can be molded as one piece. The tank 10 may be made of metal, and the parts may be welded together or joined by other fasteners.

As seen in FIG. 2, in a cylindrical embodiment, the inlet invert may include a vent 50 for venting gases from the grease trap 10. The vent 50 may be hooked up to an external ventilation system to prevent odors from escaping the grease tank 10 into interior areas if the grease trap is installed in a building.

The inner tank 14 as best seen in FIG. 2, is roto-molded such that the inner tank 14 slides into place over the inlet invert 20 and the outlet invert 22 that lead into and out of the outer tank 12. As such, the inner tank 14 can be removed without disturbing the invert pipes leading in and out of the tank 12.

In the preferred embodiment, the inner tank 14 has thin walls 14*a* to reduce the cost of materials used to manufacture the inner tank 14. The walls of the inner tank 14 help support the upwardly sloped bottom. The cylindrical shape of FIG. 2 is stronger than a rectangular shape, but the tank may also be square, rectangular, or other shapes.

As mentioned above, the inlet invert 20 and outlet invert 22 can be molded as part of the outer tank 12. However, the inlet invert 20 and the outlet invert 22 may be parts that are made separate from the tank and assembled. The inner tank is roto-molded such that the inner tank can slide into place over and around the inlet and outlet inverts 20, 22 of the outer tank 12 without disturbing the plumbing fittings to the inverts. Likewise, the inner tank may be subsequently removed without disturbing the plumbing.

Providing the exit port end of the inlet invert 20 as high as possible maximizes the solids storage space in the downwardly sloped bottom 13. If the inlet invert 20 is not above the level of the solids layer, the solids layer may be disturbed as waste water flows into the lower chamber 28 via the inlet invert 20.

As seen in FIG. 2, a pipe 17 extends from the outlet 18 in the lid 16 through the upper chamber 26 of the inner tank 14, and extends through the hole located in the upwardly sloped bottom of the inner tank 14. Preferably, the pipe 17 has a smaller diameter than that hole so that lightweight grease may flow into the inner tank 14 through the portion of the hole that the pipe does not occupy.

Figure 3:
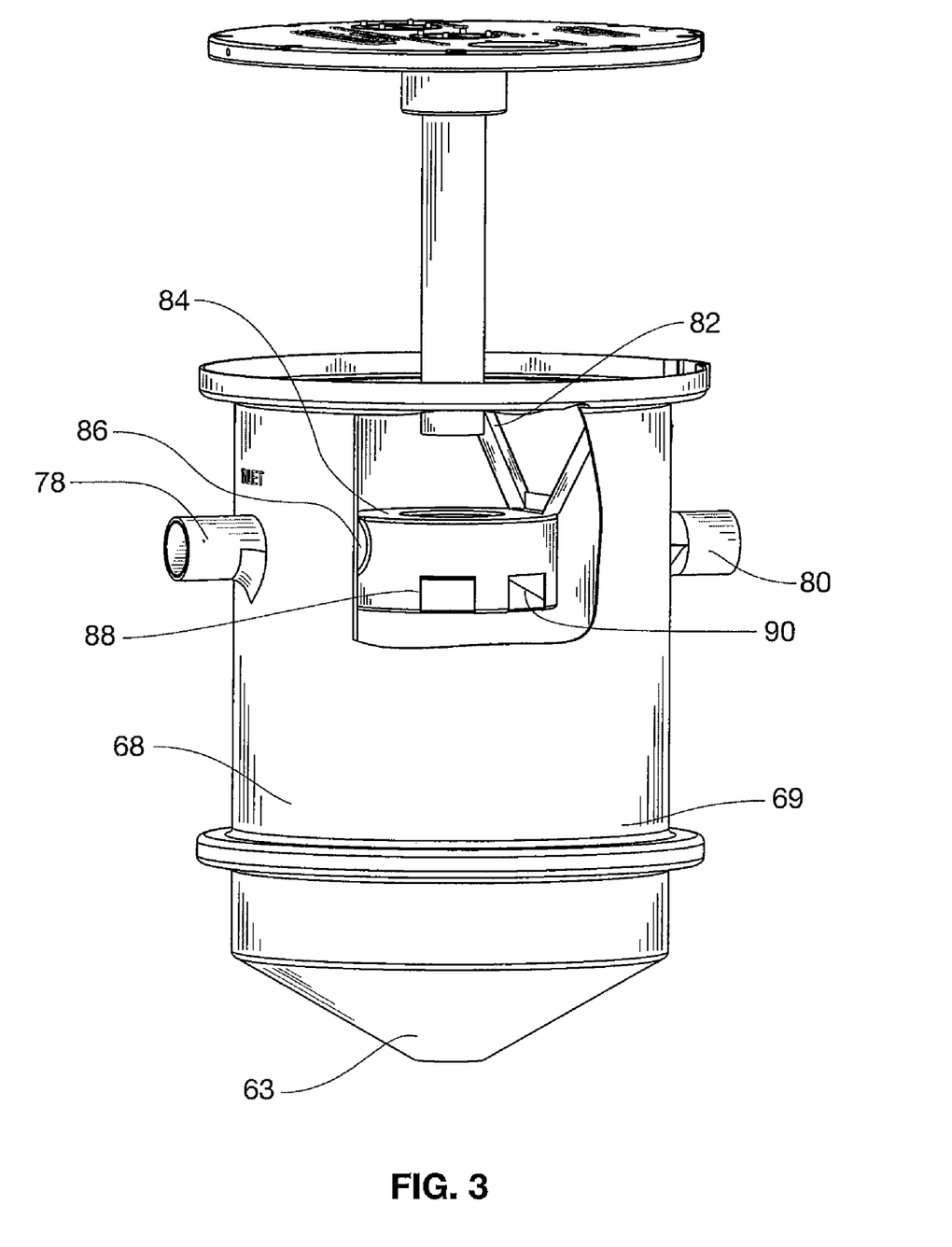
FIG. 3 is a perspective view of a solids collector, partially broken away to show internal components.

The solids interceptor 68 is seen in more detail in FIG. 3. The inlet 78 and outlet 80 are usually provided at a common level, that will become the static water level as liquid flows through the system. The solids collector 68 is primarily made up of a container 69 much like the outer tank 12 of FIG. 2. Container 69 preferably is cylindrical with a bottom that sloped downward toward a lowermost central area. In fact, one of the advantages of the invention is that the container 69 and tank 12 can be manufactured to be identical, thereby reducing manufacturing costs since the one component can be used for either part of the system.

Rigidly affixed to the inlet 78 is an intake port 86 of a solids diverter 84, which is preferably a molded plastic item having a primarily hollow toroidal shape with the pipe-shaped intake 86 protruding from it. The pipe shape 86 provides a continuous flow path for the effluent from the inlet 78 into the toroidal shape of the solids diverter 84. Preferably, the solids diverter 84 has a frusto-conically shaped floor 90, sloping from a higher interior radius to a lower outside radius, ending in ports 88 which are positioned lateral from intake 86. Thus, the solids and their effluent are received in the solids diverter 84 through the intake 86 and turned laterally right and left in the toroidal shaped component. An increase in the cross-section area of the flow path of the effluent enables the effluent to slow down its forward linear flow rate, so that the solids slow and can fall out of the toroidal shaped member 84 through the ports 88, descending the sloped floor 90.

The space above the bottom 63 of the container 69 can collect the falling solids. The toroidal shape of the solids diverter 84 provides a vertical open channel which aligns with the port 71 in a drum lid seen in FIG. 1, enabling a suction withdrawal tube to pass through the port 71 through the middle of the toroid, to the bottom 63 of the tank enabling substantially complete removal of solids at clean out time.

Shapes other than torodial can also be used, such as a branching arrangements of tubes as a Y, a T or other configurations that broaden the cross-section of the flow path to slow this flow and then discharge it into the container 69. Other geometries for placement of port 71 for a withdrawal tubes can also be used.

Water from which these solids have been depleted can continue on its path along outlet 80. Outlet 80 can be a port in the side of the container 69 at the height of the solids diverter 84, high enough so that the side ports 88 are submerged. Since that level is at the height of the static water level in the container 69, any solids that float on the effluent will be passed along with the effluent to the downstream grease interceptor 10. On the other hand, if the outlet 80 is provided with an invert, such that the intake to the invert is below the static water level, then floating solids will remain in the container 69 and the oil, grease and fat along with the other water can pass through the invert through the outlet 80 to the downstream grease interceptor 10.

Figure 4:
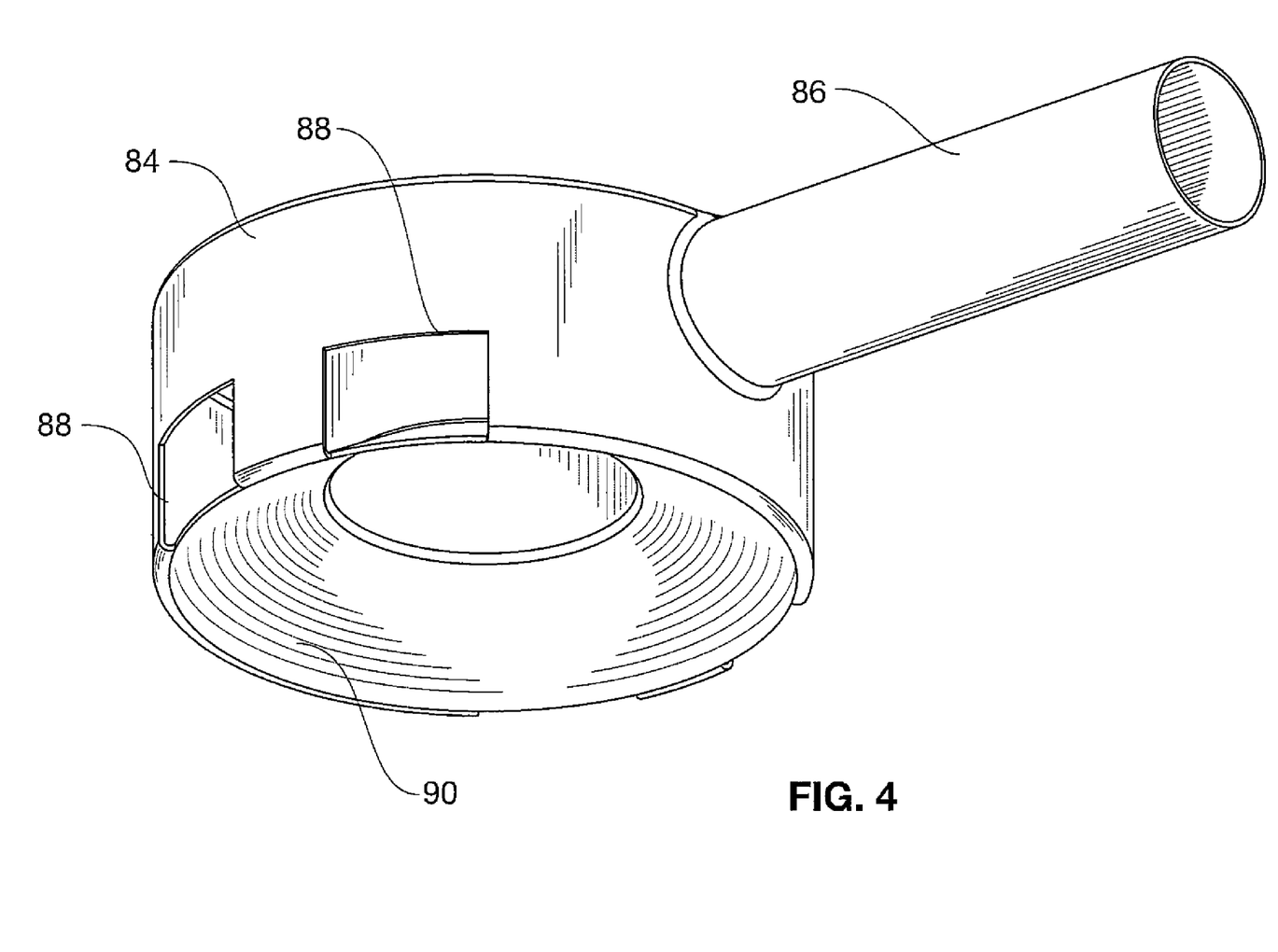
FIG. 4 is a perspective view of a solids diverter used in the solids collector.

FIG. 4 shows the solids diverter in more detail, including the inlet pipe 86, the side ports 88 and sloping wall 90. The shape of the solids diverter 84 does not have to be as shown, but should have the features of causing a lateral change of direction of the inflowing effluent with entrained solids, as well as a broadening of the cross-sectional area of the path of the effluent, so as to cause the solids to leave entrainment in the effluent.

In operation of the solids interceptor, the solids and liquids pass into the container 69 through the inlet 78 and then directly into the solids diverter 84. At the solids diverter 84 they transfer forward motion to lateral motion and slow down by virtue of increase of the path's cross-sectional area. This allows the solids with a specific gravity greater than water to fall by gravity from the outlet ports 88 down to the bottom 63 of the container 69. The solids collect on the bottom 63 and build on the accumulated solids within the container 69. Fat, oil and grease and water in the effluent can pass downstream through outlet 80 to the grease tank 10.

Then, waste water enters the grease tank 10 via the inlet invert 20. The water flows into the diverging space between the upwardly sloped bottom and the downwardly sloped bottom 13. Since the upwardly sloped bottom and the downwardly sloped bottom 13 diverge from the edge of the tank to the center of the tank, as waste water flows into the diverging area, the velocity of the water flow slows, allowing the grease to rise under the influence of gravity, since it is less dense than the water. Any remaining heavy solids sink to the bottom. Lightweight greases float and gather at the upwardly sloped bottom of the inner tank and float through the central hole into the inner tank 14. Since the lightweight greases gather at a location outside of the flow path which is below the upwardly sloped bottom of the inner tank, less grease is allowed to pass back out of the tank via the outlet invert 22. The upwardly sloped bottom provides a barrier that sequesters the grease that has become trapped in the inner tank 14 from the flow of water from the inlet 20 to the outlet 22. Thus the grey water current does not entrain the sequestered grease and sweep it out of the grease trap via the outlet invert 22.

The vertical, internal pipe 17 passes through the upwardly sloped bottom of the inner tank so that the heavy solids collecting in the downwardly sloped bottom 13 may be pumped out. Continued pumping draws water from the tank, and pulls the grease back down to the lower chamber and out through the pipe 17. The pipe 17 need not be strictly vertical, but could be slanted or have horizontal elements, as long as it extends to the lower chamber 28 to enable pumping of solids and grease.

Figure 5:
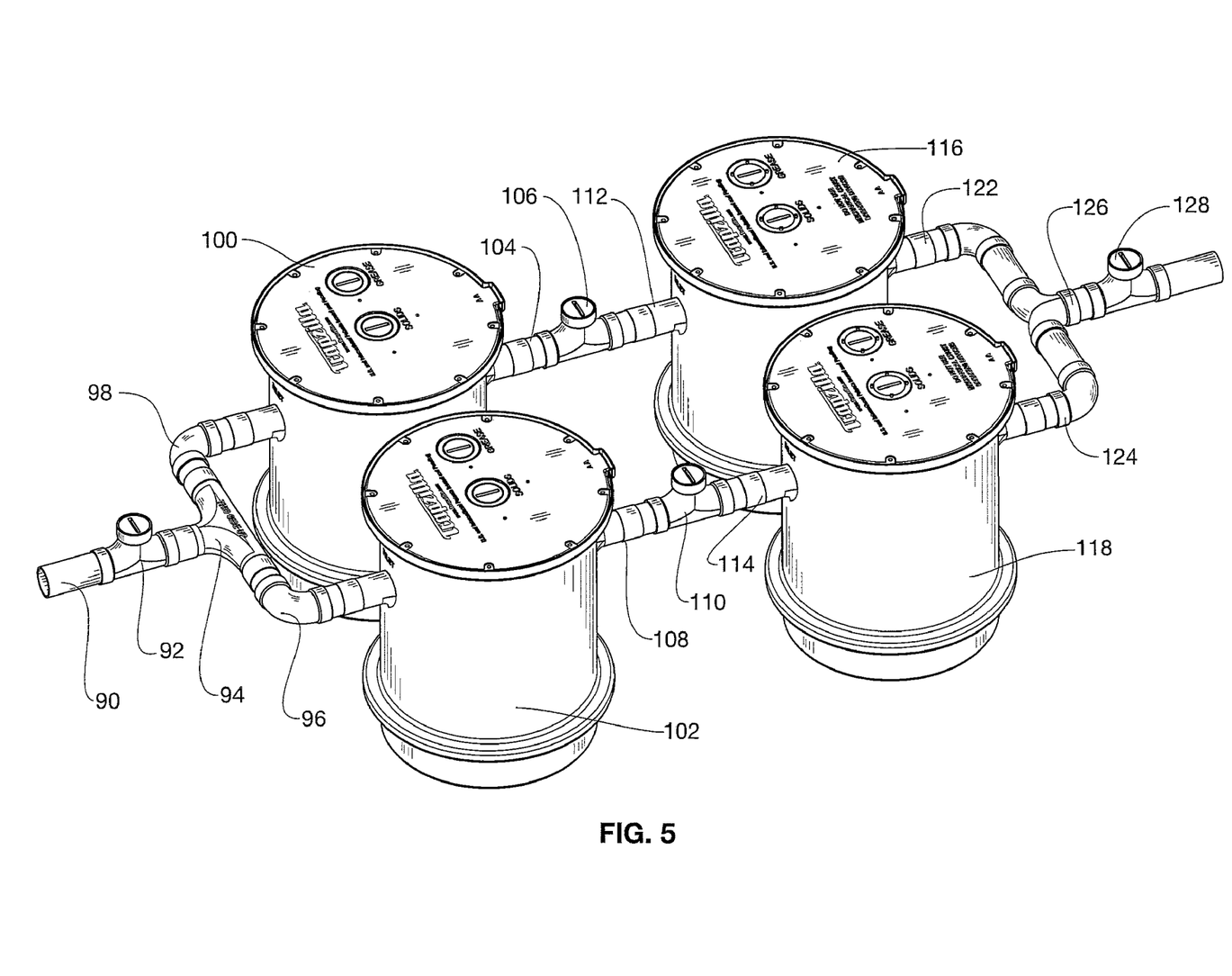
FIG. 5 is a perspective view similar to FIG. 1 but with multiple collectors in parallel.

FIG. 5 shows another embodiment of an installation of greater capacity by virtue of the fact of additional solids interceptors and grease interceptors are provided. As seen in FIG. 5, two solids interceptors 100 and 102 are provided along with their associated components on their respective paths. For even greater size volumes, numbers greater than two can be provided. The number of solids interceptors need not match the number of grease interceptors.

In FIG. 5, the inlet 90 having a clean out port 92 discharges effluent having both solids and F.O.G. through a flow splitter 94 dividing the flow into the inlets 98 and 96 of solids interceptors 100 and 102 respectively. The flow splitter is conventional and in most cases the nature of the flows on lines 96 and 98 are the same or similar, as simple bifurcation of the one effluent flow. In each of the solids interceptors 100, 102, the solids are removed as discussed above, and F.O.G.-laden waste water is allowed to discharge through respective discharges 104 and 108. Cleanout ports 110 and 106 are provided so that any clogs can be cleaned out. Waste water and FOG are discharged through inlets 114 and 112 into grease interceptors 118 and 116 respectively. These grease interceptors operate as described above. The gray water is then allowed to be discharged through discharge pipes 124 and 122, recombined at joint 126 and passed to downstream sewer lines. A clean out port 128 can be provided.

Figure 6:
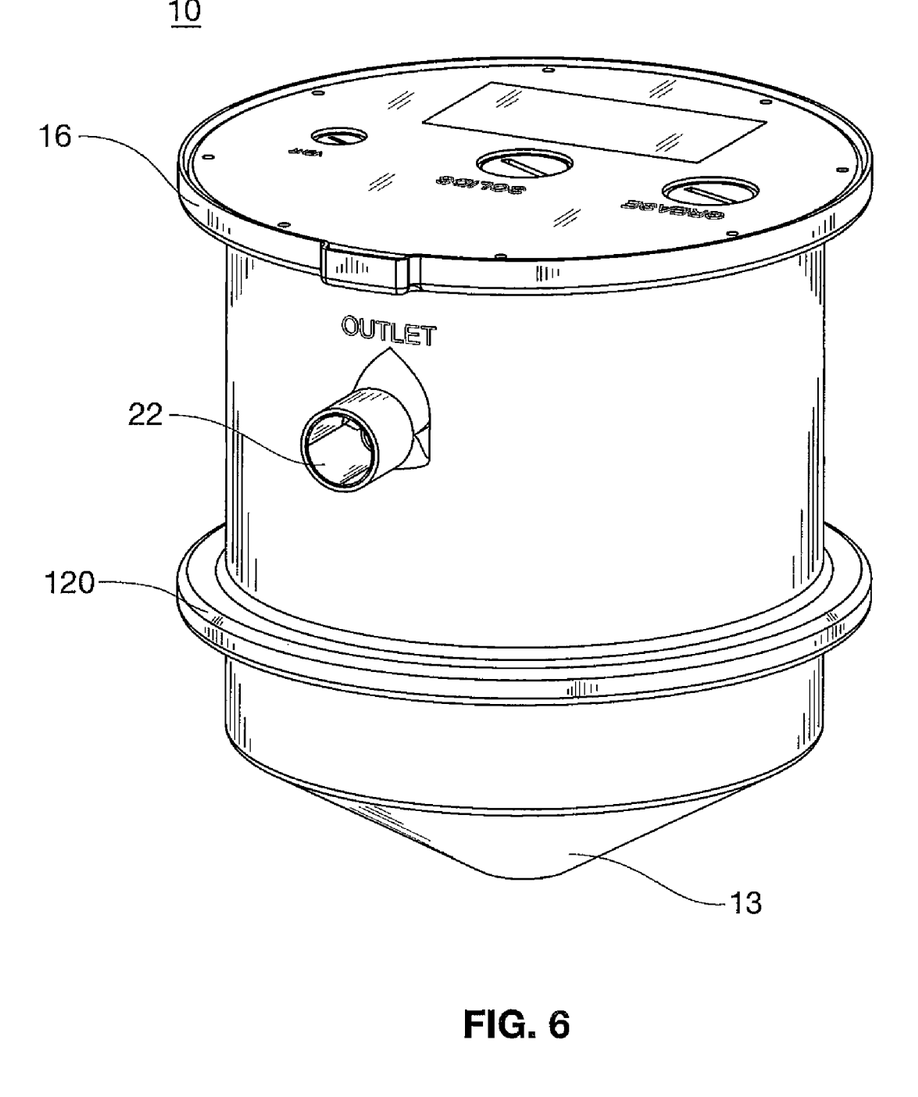
FIG. 6 is a perspective view of a further version of the invention.

As seen in FIG. 6, the grease trap 10 may include an anchor ring 120. If the grease trap 10 is buried in the ground, the anchor in the form of a ring 120 helps engage the surrounding soil and prevent the grease trap 10 from floating to the surface if water surrounds the grease trap 10. Similar rings can be used on the solids interceptor(s). Anchors of other shapes or configurations may be substituted.

As noted above, there can be manufacturing advantages arising from molding the container and the tank in the same mold. This typically results in the tank and container having the same size and shape.

Figure 7:
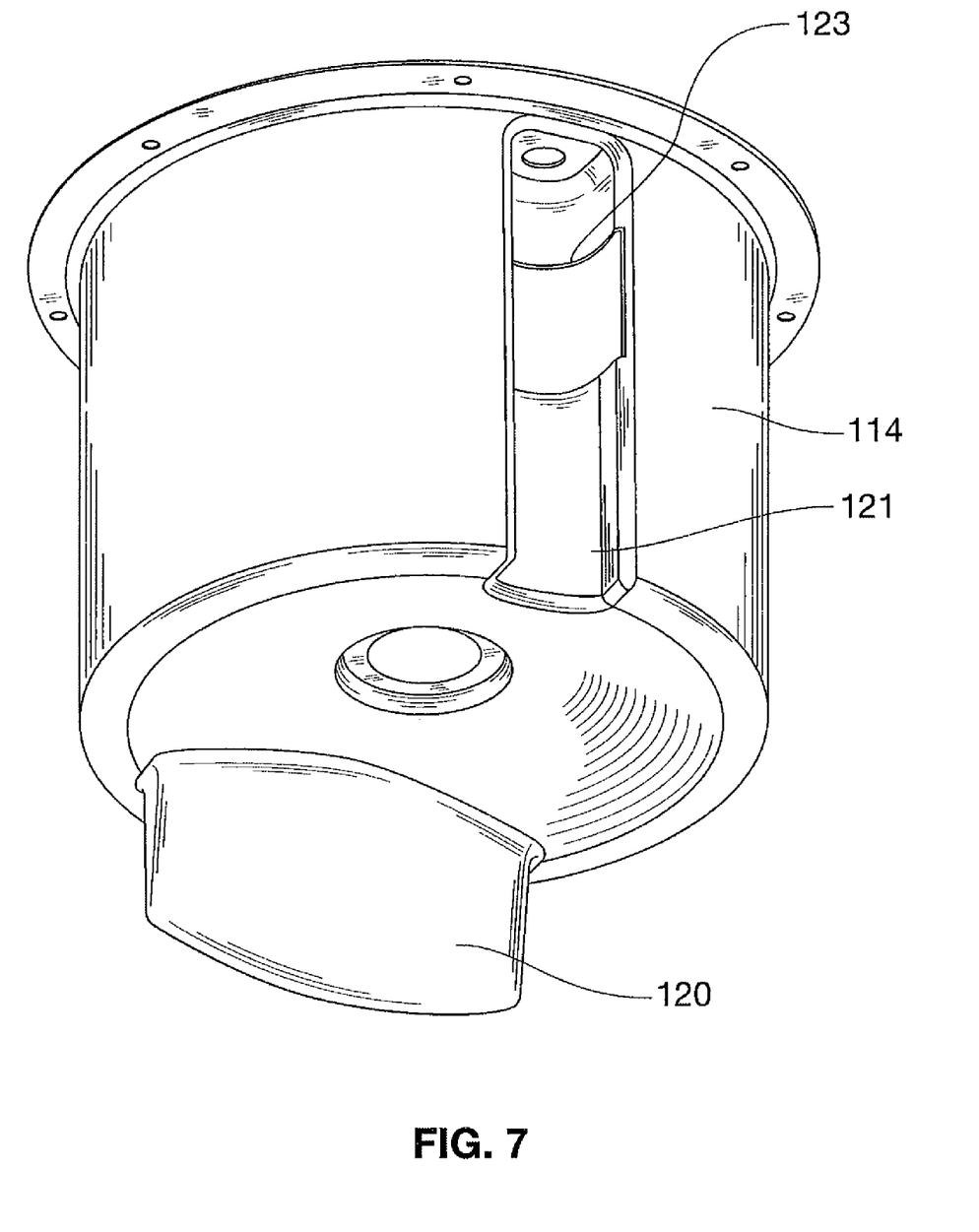
FIG. 7 is a perspective view of an alternate embodiment of the inner tank for the grease trap.

FIG. 7 shows an alternate inner tank configuration 114. A "tunnel" (not shown) is formed between the inner tank and the outer tank (where the inlet invert was previously positioned) now creates the inlet passage. This "tunnel" looks like the tunnel 21 of FIG. 2 but has a larger cross section (by about 50%), so eliminating the invert starts the "slow down" of the flow that much sooner in the process. There is a large fin like baffle 120 on the bottom of the inlet tunnel. This baffle essentially seals off with the outer tank at the bottom. This forces the incoming flow to the periphery of the outer tank, which further slows the flow and lengthens the flow path. A rectangular cut out 123 is located near the top of an outlet tunnel 121 that is on the outlet side (surrounding the outlet invert). It was found that some quantity of FOG would rise on the outside of the outlet invert and be trapped there. Cutout 123 allows the FOG to transfer into the inner tank and be sequestered. This structure results in two FOG flow paths—the center hole in the bottom of the inner tank and the rectangular hole 123 on the outlet side.

In an improvement, the center pipe 17 in FIG. 2 has been shortened so that it does not now go through the hole in the bottom of the inner tank, alleviating any concern that the gap between the pipe and inner tank would be too small and cause a point of clogging with grease or solids that may cause the unit not to function properly. Rather than making the hole in the bottom larger (which may have increased susceptibility to thermal inversion), applicant chose to shorten the pipe, so the full diameter of the hole is available for grease to pass through. Since the pipe 17 is useful as a conduit through which a hose from a pump truck can be passed to allow extraction of solids, pumpers' hoses will still find the bottom of the outer tank and successfully remove the solids.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A grease trap for separating solids that are heavier than water and F.O.G. waste from waste water comprising:
    a container having a bottom and an inlet to receive waste water substantially above the bottom and an outlet substantially above the bottom, so that solids in the waste water that are heavier than water have residence time in the container long enough to gravitationally separate towards the bottom as waste water at least partially depleted of solids that are heavier than water discharge from the container through the outlet;
    a tank having a downwardly sloped bottom;
    an inlet invert in the tank connected to the outlet of the container for receiving incoming waste water at least partially depleted of solids into the tank;
    an upwardly sloped divider dividing the tank into an upper chamber and a lower chamber, with a hole near or at an upper part of the divider, for allowing waste into the upper chamber;
    an outlet invert for removing water from the tank;
    a lid covering the tank; and
    a pipe extending towards the lower chamber for enabling sucking of solid waste out of the lower chamber.

2. A grease trap according to claim 1 wherein the container is roto-molded plastic.

3. A grease trap as claimed in claim 1 wherein the tank and container have the same size and shape.

4. A grease trap as claimed in claim 1 wherein the upwardly sloped divider is formed as a bottom of an inner tank and the inner tank has an inlet tunnel and a fin-like baffle on the divider near the inlet tunnel to force incoming flow to the periphery of the outer tank.

5. A grease trap as claimed in claim 1 wherein the upwardly sloped divider is formed as a bottom of an inner tank and the inner tank has an outlet tunnel surrounding the outlet invert and a cut out located near the top of the outlet tunnel to allow F.O.G. in the outlet tunnel to transfer into the inner tank and be sequestered.

6. A solids collector for collecting solids in waste water that are heavier than water comprising:
    a container having a cylindrical sidewall and a downwardly sloping bottom, an inlet and outlet connected to the sidewall substantially above the sloping bottom so that solids in the waste water that are heavier than water have residence time in the container long enough to gravitationally separate towards the bottom as waste water depleted of solids that are heavier than water discharge from the container through the outlet; and
    a baffle connected to the inlet and located within the tank, at approximately the level of the inlet and the outlet and below a F.O.G. collection level, and configured with a flow path for waste water that increases in cross-sectional area in a lateral direction so as to slow waste water coming into the tank from a higher speed to a lower speed and thereby reduce entrainment of solids that are heavier than water in the slowing waste water to enable the solids to precipitate to the bottom of the solids collector.

7. A solids collector as claimed in claim 6 wherein the baffle includes a housing providing an annular path for the incoming waste water and openings lateral of the inlet to divert and retard incoming waste water, wherein the openings are transverse a path from the inlet to the outlet within the tank, and wherein the annular path includes a floor that slopes downwardly from within the annulus to the openings at a periphery of the annulus.

8. A solids collector for collecting solids in waste water that are heavier than water comprising:
    a container having a cylindrical sidewall and a downwardly sloping bottom, an inlet and outlet connected to the sidewall substantially above the sloping bottom so that solids in the waste water that are heavier than water have residence time in the container long enough to gravitationally separate towards the bottom as waste water depleted of solids that are heavier than water discharge from the container through the outlet; and
    a baffle connected to the inlet and located within the tank and configured with a flow path for waste water that increases in cross-sectional area, wherein the baffle includes a housing providing transverse paths for the incoming waste water and openings lateral of the inlet to divert and retard incoming waste water so as to slow waste water coming into the tank from a higher speed to a lower speed and thereby reduce entrainment of solids that are heavier than water in the slowing waste water to enable the solids to precipitate to the bottom of the solids collector.

9. A solids collector as claimed in claim 8 wherein the path includes a floor that slopes downwardly to the openings.

10. A solids collector as claimed in claim 8 wherein the openings are transverse a path from the inlet to the outlet within the tank.

11. A method of installing a grease trap for separating waste from waste water comprising:
    installing a container having a bottom and an inlet to receive waste water substantially above the bottom and an outlet substantially above the bottom, connecting the inlet to a source of effluent including solids, waste Water and F.O.G., so that solids in the waste water that are heavier than water have residence time in the container long enough to gravitationally separate towards the bottom as waste water depleted of solids that are heavier than water discharge from the container through the outlet;
    connecting a baffle to the inlet and locating the baffle within the container, at approximately the level of the inlet and the outlet and F.O.G,. collection level, and configuring a flow path for waste water that increases in cross-sectional area in a lateral direction so as to slow waste water coming into the container from a higher speed to a lower speed and thereby reducing entrainment of solids that are heavier than water in the slowing waste water to enable the solids to precipitate to the bottom of the container;

downstream of the outlet of the container, installing a tank having a downwardly sloped bottom and connecting the outlet of the container to an inlet invert in the tank;

connecting an outlet invert from the tank to a sewage discharge line; and positioning a lid covering the tank.

12. A method as claimed in claim 11 including the preliminary steps of molding the container and the tank in the same mold so that the tank and container have the same size and shape.

13. A method of making a solids collector comprising:

molding a container having a cylindrical sidewall and a downwardly sloping bottom;

installing an inlet and outlet to opposing segments of the cylindrical sidewall; and installing a baffle on the inlet, at approximately the level of the inlet and the outlet and below a F.O.G. collection level, configured so as to slow waste water coming into the container from a higher speed to a lower speed in a lateral direction and thereby reduce entrainment of solids that are heavier than water in the slowing waste water to enable the solids to precipitate to the bottom of the solids collector.

\* \* \* \* \*